Jan. 28, 1969 P. J. WEBBER 3,424,674
UPFLOW FILTRATION OF FLUIDS
Filed May 10, 1966 Sheet 1 of 2

INVENTOR.
PAUL J. WEBBER
BY Theodore B. Roessel
ATTORNEY

Jan. 28, 1969   P. J. WEBBER   3,424,674
UPFLOW FILTRATION OF FLUIDS
Filed May 10, 1966   Sheet 2 of 2

INVENTOR.
PAUL J. WEBBER
BY
ATTORNEY 3,424,674
UPFLOW FILTRATION OF FLUIDS
Paul J. Webber, Lake Pine, Marlton, N.J., assignor to Ritter Pfaudler Corporation, Rochester, N.Y., a corporation of New York
Filed May 10, 1966, Ser. No. 548,953
U.S. Cl. 210—20
Int. Cl. B01d 23/24
6 Claims

ABSTRACT OF THE DISCLOSURE

An apparatus and method for the upflow filtration of fluids, wherein a particulate filter material having a density less than that of the fluid being filtered, such as polyethylene beads, is floated in the fluid, the filter material being collected from the upstream side or lower precincts of the filter bed, cleaned and then returned to the downstream side or upper precincts of the filter bed, one aspect in cleaning the filter material being agitating the filter material to separate heavy filtered material from the lighter filter material.

---

This invention relates to means for the uniform filtration of turbid fluids. In particular, this invention relates to means for filtering a turbid fluid through an upflow filter bed which comprises substantially uniform size particulate filter material having a specific gravity less than said fluid, and that is replenishable in situ by supplying to the upper precincts of said bed cleaned particulate filter material and removing dirtied filter material from the lower precincts of said bed.

Commonly, downflow filtering is used wherein one passes a turbid fluid downward through a bed of granular filtering material, such as sand. Particles of suspended sedimentary matter in the fluid are entrapped in the interstices between individual grains as the fluid passes through. The particles entrapped on the filter initially increase the quality of the filtration by providing yet an additional filtering barrier through which other suspended particles cannot pass. A point is reached, however, when the filtered sediment has accumulated to such an extent that the rate of flow of fluid through the filter bed is greatly impeded. Backwashing the entrapped sediment from the filter granules is then required to clean the filtering material and thus reconstitute the integrity of the filter bed. Backwashing involves forcing clean fluid at high velocity through the downflow filter bed in an upward direction, which is a reverse flow direction to that of filtration. The flow of clean backwashing fluid disrupts the settled bed and forces the filtering material into suspension. Backwashing a downflow filter bed conventionally consumes large volumes of clean fluid and causes operational delays in use of the filter, because filtration must be suspended during the backwash interval until that time when the filter material once again has resettled into an effective filter bed. Backwashing a downflow filter bed is inefficient for yet another reason. Usually the entire filter bed is disrupted to remove a residue that has accumulated merely on the upstream side of the downflow bed. Alternately, another regenerating procedure that is used in place of backwashing is to physically remove either the entire filter bed or those sediment containing upstream portions from the bed. The portions of the filter bed to be cleaned are then moved, as by truck or wheelbarrow, to a cleaner device which separates the sediment from the filter material, and when cleaned they are moved back to the bed. Such prior art methods to regenerate the integrity of a downflow filter bed thus are costly due to substantial downtime of the filter and provide only an intermittent usability of downflow filters.

For many applications such as water or sewage treatment, however, substantial advantage is found in filtering a turbid fluid by an upflow process. For example, in filtering a sewage fluid, a sludge blanket of sediment particles which would normally coagulate and settle to the bottom in a downflow filtration system and thus quickly clog a downflow filter, may be used to advantage in upflow filtration to augment the upflow filter, remove fine particles from the fluid without clogging the filter. In order to form a suitable sludge blanket for upflow filtration, the upflow rate of fluid must be controlled to be just equal to or less than the settling rate of sediment held in suspension in the fluid. The suspended sedimentary particles can then coagulate to form a floating blanket of sludge which, in turn, may act as an initial filter to entrap yet other particles as the fluid flows upward therethrough. The upflow filter bed may thus be advantageously supplemented by a sludge blanket, the filter bed acting in this instance as a polishing filter. Upflow filters by themselves are desirably used because of their non-clog properties; however, in time, and without replacement of dirtied filter material with clean filter material, the quality of filtered fluid diminishes.

Therefore, it is an object of this invention to provide an improved method and apparatus for the uniform and continuous upflow filtration of turbid fluids employing an upflow filter bed that is replenishable in situ.

Another object of this invention is to provide an improved filtering apparatus in which in situ replenishable filter bed is floated on an upflowing turbid fluid.

Still another object of this invention is to provide an improved upflow filtering apparatus whereby a less dense filter material that is replenishable in situ is used to uniformly filter a more dense fluid that is in continuous flow therethrough.

A further object of this invention is to provide an improved upflow filtering apparatus having a continuously in situ replenishable filtering bed of uniform filtering quality in a continuous flow of fluid therethrough.

A still further object of this invention is to provide an improved upflow filtering apparatus which may employ both a filter bed and sludge blanket of sediment particles to uniformly and without clogging remove solids from a continuously upflowing fluid.

The present invention is generally characterized by floating in an upflowing fluid a filter bed comprising substantially uniformly sized particulate filter material, such as beads, of density less than the fluid to be filtered; using a collector for removing dirtied filter material from the lower precincts of the floating filter bed; using a distributor for adding cleaned filter material to the upper precincts of the floating filter bed, and using a cleaning means intermediate the collector and distributor for separating sediment from the filter material; and using a circulating means intermediate the collector and distributor to move the dirtied filter material to the cleaning means, thence clean filter material to the distributor, and filter material within the floating bed in a direction generally countercurrent to the flow of fluid being filtered.

These and other objects, advantages and characterizing features of the invention will become readily evident upon considering the following description in conjunction with the accompanying drawings, in which like numbers refer to like parts.

Filtering material useful to present practice has an average density less than that of the fluids to be filtered. The filter material also is particulate and of substantially uniform geometry and size, spheroids being preferred. Yet further, the useful filter material is substantially insoluble in, and non-reactive with the fluids that it filters. Typical filter materials which may be employed for filtering sundry fluids according to present teachings are those formed from organic resins, such as polyethylene, polyvinyl chloride, polypropylene and other polyalkylene resins, polytetrafluoroethylene and other fluorocarbon resins, nylon and other polyamide resins, cellulose, cellulose acetate and other cellulose derivatives, polystyrene and its derivative resins, phenolic resins, polyepoxies, etc. Polyethylene spherical beads are a preferred form and geometry useful in the filtration of turbid waters.

Further, filtering materials may be used which ordinarily may have densities greater than the fluids to be filtered, but which, through processing techniques, have achieved an average density less than that of the fluids to be filtered. These include micro- or macro-balloons formed from glass and otherwise ordinarily dense organic or inorganic polymers, etc., and internally foamed beads of these substances having a smooth or otherwise cleanable surface.

The process and apparatus of the invention are now considered in detail in conjunction with the drawings.

Figure 1:
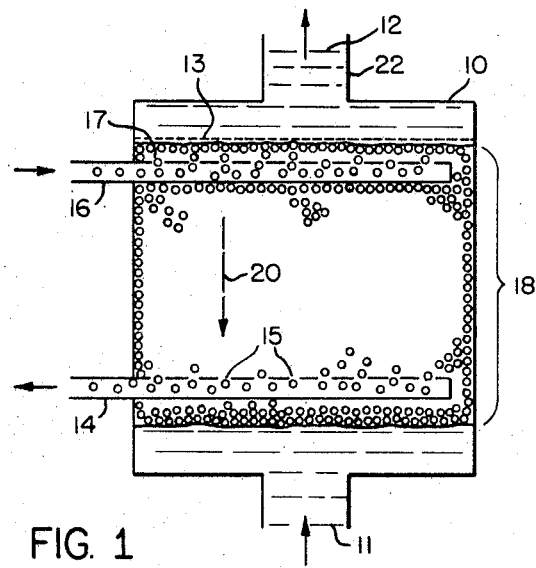
FIG. 1 is a schematic cross-sectional view of an embodiment of the upflow filtering apparatus of this invention.
Figure 2:
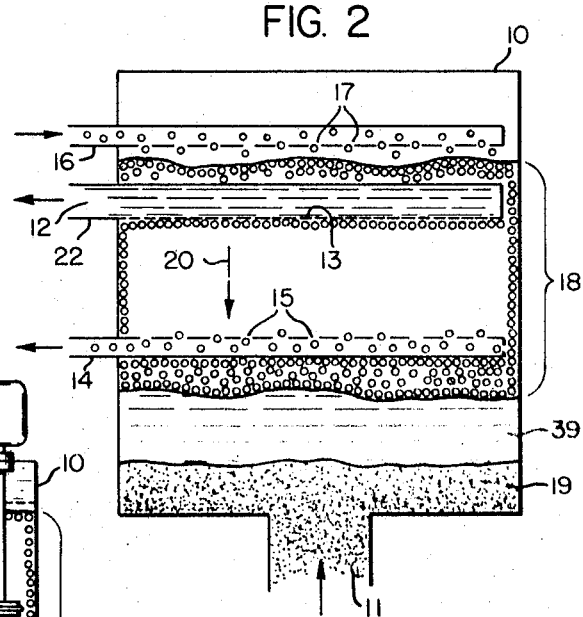
FIG. 2 is a schematic cross-sectional view of another embodiment of the invention showing in combination a sludge blanket and a floating filter bed.
Figure 3:
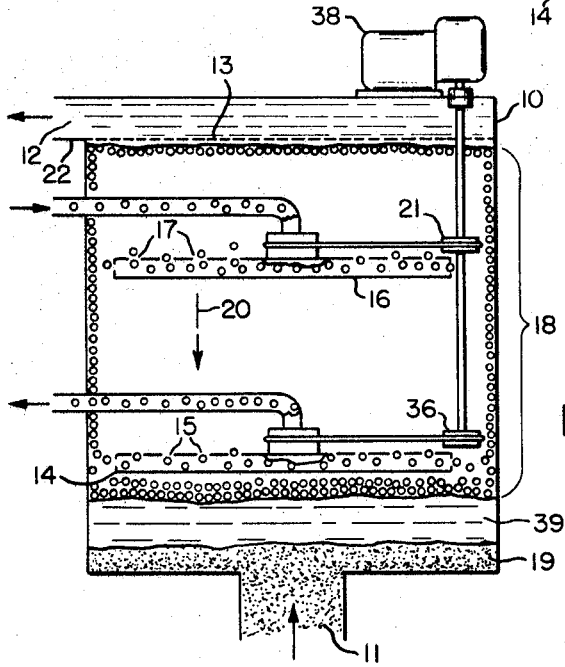
FIG. 3 is a schematic cross-sectional view of yet another embodiment of the invention showing a rotatable collector and distributor.

Referring to FIGS. 1, 2 and 3, a fluid to be filtered enters filtering vessel 10 at 11, and passes upward through filter bed 18, comprising a body of filtering material, e.g. beads floating on the fluid, and is progressively filtered in its passage therethrough; it then passes as a filtered fluid through filter bead retaining screen 13, and out of vessel 10 at 12 through pipe 22, to a point of use. The particulate filtering material in bed 18 is progressively dirtied during the course of filtration by entrapped and/or adhering sediment solids from the fluid passing therebetween; that material in the lower precincts of the bed are most dirtied, the material above being progressively cleaner. Beds of filter material in FIGS. 1, 2, 3 and 5 are indicated by beads at their periphery and internal blank spaces. It is to be understood, however, that filter material fills the spaces shown blank.

Figure 4:
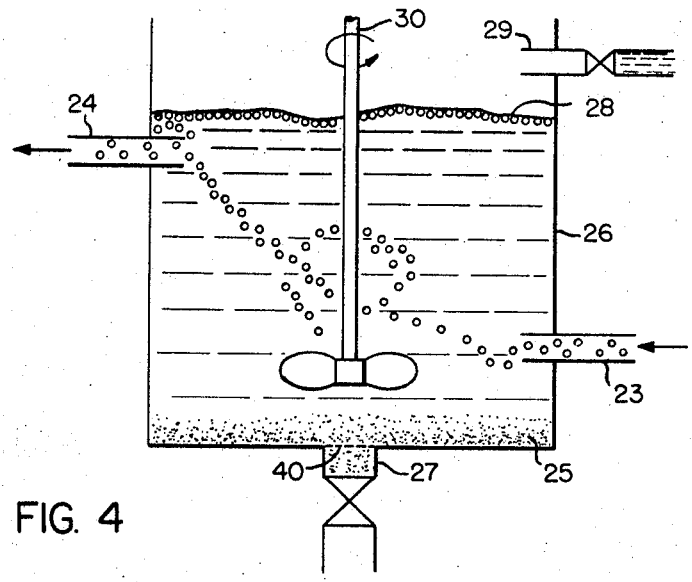
FIG. 4 is a cross-sectional view of a typical cleaning means which may be used in the practice of the invention.
Figure 5:
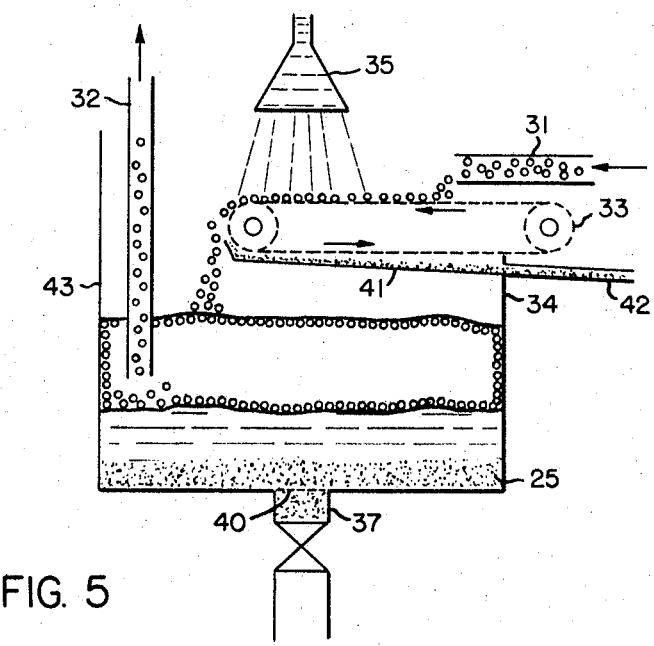
FIG. 5 is a cross-sectional view of another cleaning means which may be used by itself or in cooperation with that shown in FIG. 4 according to the practice of this invention.

Continuous operability and uniform quality of filtration of the present upflow filter requires removal of dirtied filter material and its replacement with an equivalent quantity of clean filter material. According to the invention, the dirtied filter material in the lower precincts of bed 18 are drawn into collector 14 by a circulation means (not shown) and thence to a cleaning means such as are shown in FIGS. 4 and 5. When cleaned, the filter material is readmitted through distributor 16 to the upper precincts of bed 18. During this process, filter material within the body of bed 18 progressively moves in a generally countercurrent direction 20 to that of the fluid being filtered, such that as dirtied filter material at the lower precincts is removed from bed 18 through the orifices 15 in collector 14, and as clean filter material is supplied to the upper precincts of bed 18 through orifices 17 in distributor 16, the filter material within the body of bed 18 between collector and distributor is, in general, downwardly displaced.

In FIGS. 1 and 3, both distributor 16 and collector 14 vertically terminate within the body of the bed 18. In the embodiment of FIG. 2, distributor 16 at the upper precincts of bed 18, terminates above the surface of the floating filter bed. Thus, for the purposes of this invention, the term "upper precincts" denotes a location above the vertical median point of the bed and may be at a point either vertically within the filter bed or above the filter bed. The term "lower precincts" of the bed denotes a location below the vertical median point of the bed and within the bed.

Referring to FIG. 3, collector 14 and distributor 16 are rotatably mounted so as to be enabled to axially sweep through the body of bed 18 and provide a more even collection and distribution of filter material. Rotation may be actuated by any convenient means such as pulleys 21 and 36 moved by a motor 38. Although the collector and distributor are shown as rotatably mounted in the embodiment of FIG. 3, the present invention is not limited thereto but more generally contemplates movable collectors and distributors which may move in a generally horizontal plane therethrough to evenly collect and distribute filter beads. For example, in another embodiment, movable collectors and distributors may be set upon horizontally disposed tracks, to sweep through horizontal planes of the filter bed.

With reference to FIGS. 2 and 3, the rate of the upward flow of fluid is adjusted so that it is just equal to or less than the settling rate of the particles of sediment suspended in the fluid in order that sludge blanket 19 may be formed. Intermediate the upper surface of sludge blanket 19 and the lower surface of floating bed 18 is shown as an upflowing body of partially filtered fluid 39. The partially filtered fluid then passes through filter bed 18 and out pipe 12 as a filtered fluid. In some embodiments the sludge blanket may be floated against the lower surface of bed 18, eliminating a discrete body of fluid 39.

In FIG. 2, filter material retaining screen 13 is an integral part of outflow pipe 22, which pipe is at the upper precincts of bed 18 and within the bed of filter material. In FIGS. 1 and 3, filter material retaining screen 13 is at the upper precincts of bed 18, and above the bed.

With reference to circulation of the filter material from collector 14 to distributor 16, any suitable circulation means may be employed, such as that using pumps or vacuum systems wherein the filter material circulated does not come into contact with excessive shear forces which would abrade it. Especially suitable are multiple finger pumps, the fingers of which, massage the exterior of a flexible pipe through which the particulate filter material to be circulated may flow.

The cleaning means, according to the invention, is intermediate collector 14 and distributor 16, and regenerates clean filter material to replenish bed 18. Typical cleaning means are illustrated in FIGS. 4 and 5.

With reference to FIG. 4, dirtied filter material collected from the lower precincts of filter bed 18 through collector 14 is passed through pipe 23 into bath vessel 26 containing a cleaning fluid under agitation by agitator 30. The dirtied filter material is swirled and agitated in the cleaning fluid, and thus cleaned in the process. The cleaned filter material then passes into pipe 24 and thence to distributor 16 thus to replenish bed 18. Suitable pumps, aspirators, vacuum or other circulation means (not shown) are inserted intermediate collector 14 and distributor 16 to provide, at will, continuous or intermittent flow of filter material through the cleaning means. The cleaning fluid in cleaning tank 26 may be continuously or intermittently replenished, such as by new cleaning fluid entering through pipe 29; the dirtied cleaning fluid and sediment 25 may be removed through sump 27. Sump 27 may have a retaining screen 40 to prevent loss of filter material therethrough.

With reference to FIG. 5, dirty filter material from collector 14 passes to and out of pipe 31 onto endless foraminous filter belt 33 and under cleaning fluid from spray head 35. The cleaning fluid from spray head 35 washes the filter material and in so doing deposits the sediment removed therefrom onto collector tray 41 and thence out pipe 42 to a sump (not shown). The filter material drops from endless belt 33 into storage and cleaning vessel 43, and upon demand, the cleaned filter material may be withdrawn through pipe 32, thence to distributor 16 to replenish bed 18 (FIGS. 1, 2 and 3). Storage tank 43 may be fitted with a sump drain 37 to remove, at will, dirtied cleaning fluid and any settled sediment; sump 37 also may be fitted with retaining screen 40 to prevent loss of filter material therethrough. The cleaning means of FIGS. 4 and 5, also may be used in tandem multiples of one or both types; the beads removed from one cleaning means may enter another cleaning means for such special needs as where multiple washings may be required, or where different types of cleaning fluids must each be used separately to remove different types of sediment from the filter material.

From the foregoing descriptions, it will be appreciated that multiple filtering apparatuses, such as are singly shown in FIGS. 1, 2 and 3, may be used in tandem for special needs, each unit employing perhaps a different type, geometry, or size of filter material, the fluid exiting from one filter entering as an upflow feed to another filter. It is also to be appreciated, according to present teachings, that in any one filter any combination of static or rotatable collectors or distributors at different vertical levels may be used to answer special filtering or recirculation needs.

Yet further, it will be appreciated that a multiple filtering apparatus, such as is singly shown in FIGS. 1, 2 and 3, also may be used wherein a single filtering vessel 10 employs a plurality of paired static or rotatable collectors and distributors located at different vertical levels in combination with a multi-layer floating filter bed. Therein, each pair of collectors and distributors is within each layer of, say, a different size or type of filter material, thus to collect dirtied filter material of a single size or type within each layer, circulate the filter material to a cleaning means and thence to the distributor at the upper precincts of the layer. This embodiment would enable one to maintain the uniform filtering characaeristics and the integrity of each layer of filter material within the composite filter bed, by replenishing dirtied filter material within each layer with clean filter material of the same particular size or type.

The present invention provides an upflow filtering apparatus which need not be shut down during the process of an in situ replenishing of cleaned filter material to the floating filter bed; that is to say, the upflow filtering of fluid may be continuously pursued during such in situ replenishment. Moreover, the present apparatus is also eminently suited for use where, for particular purposes, it becomes desirable to provide an intermittant upflow filtering process. Therein, the fluid to be filtered is intermittently stopped in its flow through the filtering apparatus, and then the filter materials of the filter bed are circulated to replenish clean filter material for dirtied material employing the process of the present invention. Intermittent filtration employing in situ replenishment of upflow filter beds according to the practice of this invention, is far more economical and versatile than intermittent downflow filtration due to the infrequent and very short durations required for an in situ replenishing of even the entire upflow filter bed, whether single or multilayered, as compared with the frequent and long termed downtime and activities required to regenerate to an adequate single or multilayered downflow filter bed.

I claim:
1. A method for the upflow filtration of a fluid flowing through a filter vessel comprising the steps of:
   (a) floating a bed of buoyant, particulate filter material in said fluid flowing through said vessel;
   (b) flowing said fluid upwardly through said floating bed while at the same time preventing filter material from being carried from said vessel with said fluid;
   (c) removing filtered fluid from the upper portions of said vessel;
   (d) removing filter material from the lower precincts of said filter bed through collector means;
   (e) circulating said removed filter material through cleaning means, and thereafter to the upper precincts of said filter bed;
   (f) agitating said filter material in said cleaning means to separate said particulate filter material and material filtered from said fluid; and
   (g) supplying the cleaned filter material to the upper precincts of said filter bed through distributor means.

2. A method according to claim 1 wherein said fluid is water and said filter material comprises polyethylene beads.

3. A method according to claim 1, further comprising rotating said collector means and distributor means through the lower and upper precincts of said filter bed respectively.

4. An apparatus for the upflow filtration of a fluid including a vessel constructed and arranged to permit the upward flow of a fluid therethrough, a bed of particulate filter material confined in said vessel, said material having a density less than that of said fluid so that a floating filter bed is formed in said vessel during filtration of said fluid, the improvement comprising:
   (a) a collector located in the lower portions of said vessel and so positioned to remove filter material from said floating bed during filtration of said fluid;
   (b) a distributor located in the upper portions of said vessel and so positioned to supply filter material to said floating bed during filtration of said fluid;
   (c) circulation means interconnecting said collector and distributor to circulate filter material from said collector to said distributor; and
   (d) cleaning means including particulate material agitator means in fluid connection with said circulation means and located in the circuit intermediate said collector and distributor, said cleaning means constructed and arranged to clean said filter material removed by said collector and passed through said circulation means to said distributor.

5. Apparatus according to claim 4, wherein said collector and said distributor are movably mounted in said vessel for movement through said filter bed to uniformly remove and supply said filter material to said bed.

6. Apparatus according to claim 5 wherein said filter material comprises polyethylene beads.

References Cited

UNITED STATES PATENTS

| | | | |
|---|---|---|---|
| 468,984 | 2/1892 | Boeing | 210—283 |
| 2,057,887 | 10/1936 | Elliott et al. | 210—268 X |
| 2,572,848 | 10/1951 | Fitch | 210—263 X |
| 2,742,381 | 4/1956 | Weiss et al. | 210—20 X |
| 2,758,070 | 8/1956 | Yurko | 210—268 X |
| 2,925,382 | 2/1960 | Kent et al. | 210—20 X |
| 3,122,594 | 2/1964 | Kielback | 23—285 X |
| 3,305,096 | 2/1967 | Schleiss | 210—195 |

REUBEN FRIEDMAN, *Primary Examiner.*

W. S. BRADBURY, *Assistant Examiner.*

U.S. Cl. X.R.

210—80, 189, 270